US012138657B2

(12) United States Patent
Ding et al.

(10) Patent No.: US 12,138,657 B2
(45) Date of Patent: Nov. 12, 2024

(54) METHOD FOR MASKLESS PATTERNING OF METAL ALLOYS

(71) Applicant: University of Iowa Research Foundation, Iowa City, IA (US)

(72) Inventors: Hongtao Ding, Coralville, IA (US); Avik Samanta, Iowa City, IA (US); Wuji Huang, Iowa City, IA (US)

(73) Assignee: University of Iowa Research Foundation, Iowa City, IA (US)

( * ) Notice: Subject to any disclaimer, the term of this patent is extended or adjusted under 35 U.S.C. 154(b) by 156 days.

(21) Appl. No.: 17/879,385

(22) Filed: Aug. 2, 2022

(65) Prior Publication Data

US 2023/0037586 A1 Feb. 9, 2023

Related U.S. Application Data

(60) Provisional application No. 63/228,542, filed on Aug. 2, 2021.

(51) Int. Cl.
| | |
|---|---|
| B05D 7/14 | (2006.01) |
| B05D 3/06 | (2006.01) |
| B05D 5/04 | (2006.01) |
| B05D 5/08 | (2006.01) |
| B23K 26/352 | (2014.01) |
| C09D 5/00 | (2006.01) |
| C09D 7/80 | (2018.01) |

(52) U.S. Cl.
CPC ............. *B05D 7/14* (2013.01); *B05D 3/06* (2013.01); *B05D 5/04* (2013.01); *B05D 5/08* (2013.01); *B23K 26/352* (2015.10); *C09D 5/00* (2013.01); *C09D 7/80* (2018.01)

(58) Field of Classification Search
CPC .......... B05D 3/002; B05D 3/06; B05D 3/061; B05D 3/068; B05D 5/04; B05D 5/08; B23K 26/352; C23C 22/78; C23C 26/00
See application file for complete search history.

(56) References Cited

U.S. PATENT DOCUMENTS

| | | | |
|---|---|---|---|
| 10,022,227 B2* | 7/2018 | Jennissen | B23K 26/352 |
| 11,878,372 B2* | 1/2024 | Zhong | B23K 26/0006 |
| 2005/0008876 A1* | 1/2005 | Teranishi | C03C 17/42 |
| | | | 428/428 |
| 2019/0054571 A1* | 2/2019 | Ding | B05D 5/08 |

FOREIGN PATENT DOCUMENTS

WO WO-2020000868 A1 * 1/2020 ............ B05D 5/08

* cited by examiner

*Primary Examiner* — Michael P Wieczorek
(74) *Attorney, Agent, or Firm* — Schwegman Lundberg & Woessner, P.A.

(57) ABSTRACT

The disclosure relates to maskless, laser-assisted methods for making a metal surface comprising at least one of hydrophobic and hydrophilic regions; and at least one of micro- and nanostructured regions.

20 Claims, 7 Drawing Sheets

FIGS. 6A-6D a. Strategy I b. Strategy II

When evaluated from digital data, the integral is normally approximated by a trapezoidal rule:

$$R_a = \frac{1}{N}\sum_{n=1}^{N}|r_n|$$

Graphically, the average roughness is the area (shown below) between the roughness profile and its center line divided by the evaluation length (normally five sample lengths with each sample length equal to one cutoff):

The average roughness, Ra, is an integral of the absolute value of the roughness profile. It is the shaded area divided by the evaluation length, L. Ra is the most commonly used roughness parameter.

FIG. 10

METHOD FOR MASKLESS PATTERNING OF METAL ALLOYS

CROSS-REFERENCE TO RELATED APPLICATIONS

This application claims the benefit of U.S. Provisional Appl. Ser. No. 63/228,542, filed Aug. 2, 2021, which is incorporated by reference as if fully set forth herein.

BACKGROUND

Wettability-patterned surfaces comprising consecutive superhydrophobic and superhydrophilic regions in a designed orderliness can enable effective control of fluids in specific wettability segments. Recently, engineered surfaces with patterned wettability have been the subject of increased interest among researchers for various applications, including water harvesting from fog, fluid transportation, inkjet printing, microfluid confinement, boiling heat transfer, and oil-water interface interaction.

Most known surface processes require the use of masking to selectively process extreme wetting areas for metals and alloys. For example, a wettability-patterned surface has been fabricated on an aluminum alloy substrate by combining electrochemical etching and immersion treatment. In this instance, the superhydrophobic substrate was first fabricated by electrochemical etching using a NaCl solution and immersed in a fluoroalkyisilane ethanol solution. Then, to yield a patterned wetting surface, a second electrochemical etching step was performed on a selected area with the remaining area masked off. Sun et al. developed a mask-based method to yield extreme wettability patterns on several engineering metal alloys. In this method, a mask was bonded on the substrate by exposing only the desired superhydrophobic area. Subsequently, chemical processing and fluorosilane treatments were applied to achieve superhydrophobicity in the selected area. The mask was then removed, and the remaining area was chemically etched to produce superhydrophilic zones.

External UV illumination-based techniques have also been developed to fabricate patterned extreme wetting surfaces based on photocatalytic decomposition under UV-illumination. For example, an inkjet technique was developed to fabricate a superhydrophobic-superhydrophilic pattern on $TiO_2$ coated aluminum surface. After applying the $TiO_2$ coating, the entire surface was modified using octadodecylphosphonic acid to achieve superhydrophobicity. Then, a UV-light resistant inkjet was positioned at selected locations to protect the superhydrophobic regions, and the octadodecylphosphonic acid was removed from the remaining area using UV irradiation. Finally, the UV light-resistant ink was washed away to achieve the patterned wetting surface. Rather than using a UV-resistant inkjet, a photomask was applied to protect the superhydrophobic area during UV exposure in fabricating the superhydrophobic-superhydrophilic pattern.

These surface processing methods involve multiple time-consuming steps and extensive masking and are, hence, quite costly in fabricating superhydrophobic-superhydrophilic patterns. Specifically, the need for masking always introduces two additional steps, i.e., the application and the removal of the mask layer, resulting in increased complexity and processing time. The primary challenge to achieving wettability-patterned surfaces for real-world applications is then overcome to develop a high-throughput, low-cost surface engineering method comprising high precision and flexibility for large-area and curved surfaces.

In recent years, laser-based surface modification methods have presented considerable advantages over other competing processes to achieve extreme wettability due to their capability for direct maskless patterning, high precision, ease of automation, and process flexibility. However, most existing laser-based techniques can only fabricate stand-alone wetting surfaces for metal alloys, i.e., superhydrophobic, superhydrophilic surfaces, or switchable wettability, and also suffer from extreme low processing efficiency due to the high-resolution mode employed in these processes. Recently, a laser processing method was reported under which a patterned wetting surface is produced by performing a secondary laser etching on laser textured superhydrophobic surface. However, the critical issue regarding surface chemistry stability, particularly in the hydrophilic region, was not addressed. In this method, immediately upon laser texturing, the textured metal surface usually exhibits superhydrophilicity. Laser texturing yields a surface layer with micro/nanoscale structures covered with metal oxide. Metal oxides typically have higher surface energy and behave as hydrophilic as water can easily form hydrogen bonds with the electronic structure of the oxides. However, laser textured metal alloys are subject to transition from superhydrophilicity to superhydrophobicity on exposure to atmospheric conditions due to the adsorption of long hydrocarbon chains of organic molecules present in air. Therefore, an intermediary chemical modification step is required after laser texturing to stabilize the wettability to either superhydrophobicity or superhydrophilicity.

SUMMARY

To further advance such contrasting wettability Interfaces, it is necessary to develop a process which can provide a sharp transition of wettability from one pattern to another as well as the capability to rapidly treat large complex surfaces using automation. Specifically, high wettability distinction on such fabricated surfaces is essential to improve efficiency of these and other applications.

The disclosure generally relates to a laser-based functionalization method developed to directly fabricate a superhydrophobic-superhydrophilic wettability pattern on metal alloy without the usage of any mask. In comparison with other laser-based fabrication techniques for creating wettability patterns, this process decouples extreme wettability from surface topography. This method is capable of independently controlling surface structures and surface chemistry for both superhydrophobic and superhydrophilic regions to have a stable wettability.

DESCRIPTION OF THE DRAWINGS

The drawings illustrate generally, by way of example, but not by way of limitation, various embodiments discussed herein.

FIGS. 4A-4I are photographs and plots showing surface wettability patterning via LAF.

While not wishing to be bound by any specific theory.

FIGS. 6A-6D are spectra showing the progression of surface chemistry XPS spectra show different chemistry for designated superhydrophobic area A and superhydrophilic area B for Strategy I.

FIGS. 7A-7E are micrographs and plots showing surface topography patterning via LAF.

FIGS. 8A-8C is plots showing reflectivity of LAF treated surfaces in visual and infrared spectra for (i) microchannel textured surfaces by controlling laser power intensity using the same spacing of 250 µm between microchannel (FIG. 8A); (ii) microchannel textured surfaces by controlling the spacing between microchannels during processing in air with a same laser power intensity of 6.4 $GWcm^{-2}$ (FIG. 8B); and (iii) nanoscale textured surfaces by controlling laser power Intensity (FIG. 8C), respectively.

Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated. Although terms such as "top", "bottom", "upper", "lower", "under", "over", "front", "back", "up" and "down", and "first" and "second" may be used in this disclosure, it should be understood that those terms are used in their relative sense only unless otherwise noted.

DESCRIPTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Figure 1:
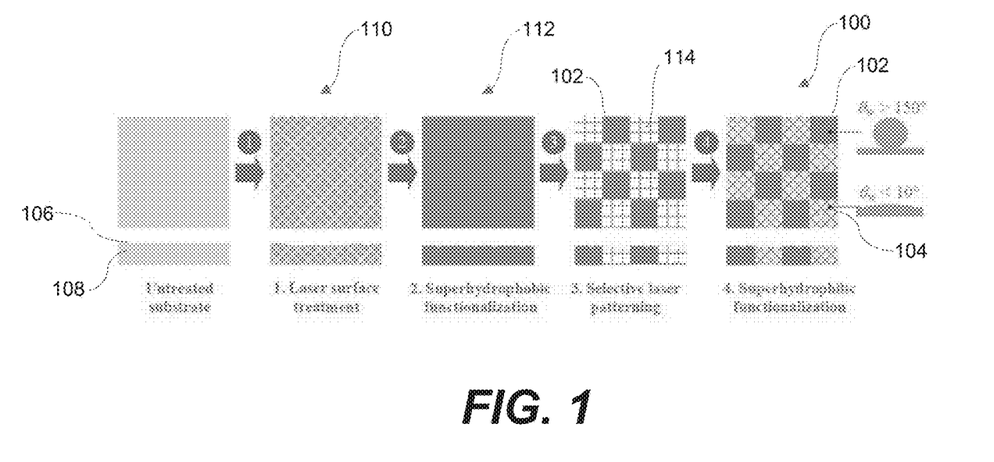
FIG. 1 is a schematic showing an example of an implementation of the methods described herein for making a micro- and nanostructured metal surface comprising at least one hydrophobic (e.g., superhydrophobic) region and at least one hydrophilic (e.g., superhydrophic) region. The strategy depicted creates micro-structured superhydrophilic regions over a micro- and nanostructured superhydrophobic background.

Making reference to FIG. 1, the instant disclosure relates to a maskless method of making a micro- and nanostructured metal surface 100 comprising at least one hydrophobic (e.g., superhydrophobic) region 102 and at least one hydrophilic (e.g., superhydrophilic) region 104, the method comprising: first treating at least one portion of a first major surface 106 of a metal piece 108 along a laser scan path to obtain a first treated surface 110; second treating the first treated surface 110 with a composition comprising a hydrophobic surface modifier to obtain a hydrophobic first treated surface 112; third treating at least one portion of the hydrophobic first treated surface 112 of the metal piece along a laser scan path to obtain a second treated surface 114 (and the at least one hydrophobic region 102); and fourth treating the second treated surface 114 with a composition comprising a hydrophilic surface modifier to obtain a hydrophilic first treated surface corresponding to the at least one hydrophilic region 104.

A variation of the method described in FIG. 1 is one where the first treated surface 110 is treated with a hydrophilic surface modifier instead of a hydrophobic surface modifier; and second treated surface 114 is treated with a hydrophobic surface modifier instead of a hydrophilic surface modifier. Such a method is a maskless method of making a micro- and nanostructured metal surface comprising at least one hydrophobic (e.g., superhydrophobic) region and at least one hydrophilic (e.g., superhydrophilic) region, the method comprising: first treating at least one portion of a first major surface of a metal piece along a laser scan path to obtain a first treated surface; second treating the first treated surface with a composition comprising a hydrophilic surface modifier to obtain a hydrophilic first treated surface; third treating at least one portion of the hydrophilic first treated surface of the metal piece along a laser scan path to obtain a second treated surface; and fourth treating the second treated surface with a composition comprising a hydrophobic surface modifier to obtain a hydrophobic first treated surface.

The first treating can be performed with the metal piece 108 immersed in water. In this example, the third treating can be performed with the metal piece immersed in water or exposed to air. In addition, the third treating can be performed with the metal piece immersed in water. In this example, the first treating can be performed with the metal piece immersed in water or exposed to air. Or the first treating and the third treating can be performed with the metal piece immersed in water.

The first treating can be performed with the metal piece 108 exposed to air. In this example, the third treating can be performed with the metal piece immersed in water or exposed to air. In addition, the third treating can be performed with the metal piece exposed to air. In this example, the first treating can be performed with the metal piece immersed in water or exposed to air. Or the first treating and the third treating can be performed with the metal piece exposed to air.

Figure 2:
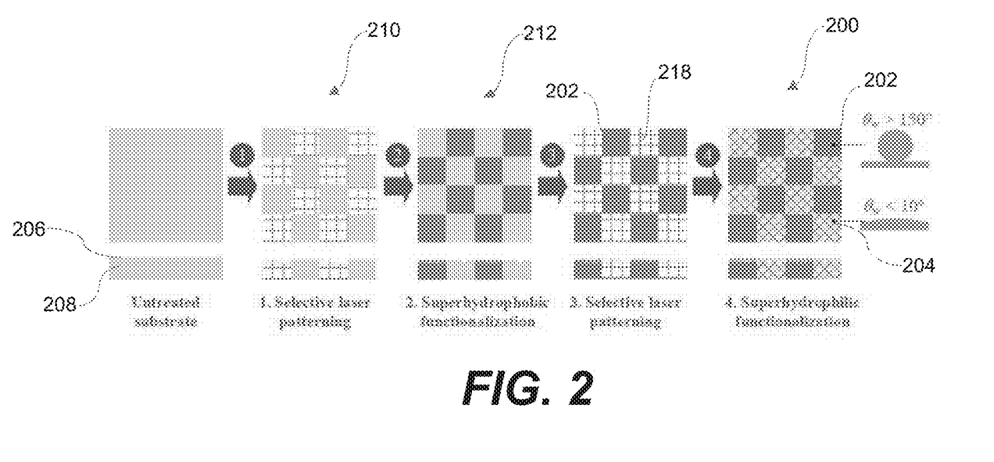
FIG. 2 is a schematic showing another example of an implementation of the methods described herein for making a micro- and nanostructured metal surface comprising at least one hydrophobic (e.g., superhydrophobic) region and at least one hydrophilic (e.g., superhydrophilic) region. The strategy depicted patterns the substrate with micro-structured superhydrophobic and micro-structured superhydrophilic regions.

Making reference to FIG. 2, the instant disclosure relates to a maskless method of making a micro- and nanostructured metal surface 200 comprising a hydrophobic (e.g., superhydrophobic) region 202 and hydrophilic (e.g., superhydrophilic) region 204, the method comprising: first treating at least one first portion of a first major surface 206 of a metal piece 208 along a laser scan path to obtain a first treated surface 210; second treating the first treated surface 210 with a composition comprising a hydrophobic surface modifier to obtain a hydrophobic first treated surface 212; third treating at least a second portion of a first major surface of a metal piece along a laser scan path to obtain a second treated surface 218, the second portion different from the first portion; and fourth treating the second treated surface 218 with a composition comprising a hydrophilic surface modifier to obtain a hydrophilic first treated surface corresponding to the at least one hydrophilic region 204.

A variation of the method described in FIG. 2 is one where the first treated surface 210 is treated with a hydrophilic surface modifier instead of a hydrophobic surface modifier; and second treated surface 218 is treated with a hydrophobic surface modifier instead of a hydrophilic surface modifier. Such a method is a maskless method of making a micro- and nanostructured metal surface comprising a hydrophobic (e.g., superhydrophobic) region and hydrophilic (e.g., superhydrophilic) region, the method comprising: first treating at least one first portion of a first major surface of a metal piece along a laser scan path to obtain a first treated surface; second treating the first treated surface with a composition comprising a hydrophilic surface modifier to obtain a hydrophilic first treated surface; third treating at least a second portion of a first major surface of a metal piece along a laser scan path to obtain a second treated surface, the second portion different from the first portion; and fourth treating the second treated surface with a composition comprising a hydrophobic surface modifier to obtain a hydrophobic first treated surface.

The first treating can be performed with the metal piece 208 immersed in water. In this example, the third treating can be performed with the metal piece immersed in water or exposed to air. In addition, the third treating can be performed with the metal piece Immersed in water. In this example, the first treating can be performed with the metal piece immersed in water or exposed to air. Or the first treating and the third treating can be performed with the metal piece immersed in water.

The first treating can be performed with the metal piece 208 exposed to air. In this example, the third treating can be performed with the metal piece immersed in water or exposed to air. In addition, the third treating can be performed with the metal piece exposed to air. In this example, the first treating can be performed with the metal piece immersed in water or exposed to air. Or the first treating and the third treating can be performed with the metal piece exposed to air.

The hydrophobic (e.g., superhydrophobic region) can have a water contact angle when exposed to water of at least about 125°; at least about 130°; at least about 135°; at least about 140°; at least about 145°; or at least about 150°. For example, the hydrophobic (e.g., superhydrophobic region) can have a water contact angle when exposed to water of about 120° to about 170°; about 130° to about 170°; about 140° to about 160°; about 150° to about 170°; about 150° to about 160; or about 150° to about 165°.

In contrast, the hydrophilic (e.g., superhydrophilic) region can have a water contact angle of less than about 90°, less than about 85°, less than about 75, less than about 65°, less than about 55°, less than about 45, less than about 35°, less than about 30, less than about 20°, less than about 15°, less than about 10°, less than about 5°; from about 0° to about 10°, about 0° to about 90°, about 10° to about 90°, about 30° to about 50°, about 25° to about 75°, about 35° to about 65°, about 0° to about 30°, about 10° to about 30°, about 10° to about 20° or about 2° to about 30° or less.

The water contact angle (WCA) can be measured in any suitable way. One method for measuring the water contact angle for the at least one portion of the first major surface involves using a contact angle goniometer (e.g., a Rame-Hart model 100 goniometer) coupled with a high-resolution CMOS camera (e.g., 6-60× magnification, Thor Laboratories). For each WCA measurement, about 4 µL volume of water is dropped to form a still water droplet on the specimen surface, and its optical shadowgraph is obtained using a CMOS camera. The optical shadowgraph is quantitatively analyzed using ImageJ software to determine the WCA for each measurement. Multiple WCA measurements are performed at various locations inside each specimen surface, and an average value of measurement results is obtained.

The nano- or microstructured metal surfaces described herein can have a spectral reflectance of less than about 35%; less than about 30%; less than about 25%; less than about 20%; less than about 15%; less than about 10%; or less than about 5% within the visible spectrum (e.g., 400 nm to about 700 nm). For example, the micro- and nanostructured metal surfaces described herein can have a spectral reflectance of about 1% to about 35%; about 1% to about 25%; about 10% to about 25%; about 5% to about 30%; about 5% to about 20%; about 5% to about 15%; or about 1% to about 5% within the visible spectrum.

For example, a micro- and nanostructured metal surface can have a spectral reflectance of less than about 35%; less than about 30%; less than about 25%; less than about 20%; less than about 15%; less than about 10%; or less than about 5% within the visible spectrum (e.g., 400 nm to about 700 nm). For example, a micro- and nanostructured metal surface can have a spectral reflectance of about 1% to about 35%; about 1% to about 25%; about 10% to about 25%; about 5% to about 30%; about 5% to about 20%; about 5% to about 15%; or about 1% to about 5% within the visible spectrum.

For example, a microstructured metal surface can have a spectral reflectance of less than about 35%; less than about 30%; less than about 25%; less than about 20%; less than about 15%; less than about 10%; or less than about 5% within the visible spectrum (e.g., 400 nm to about 700 nm). For example, a microstructured metal surface can have a spectral reflectance of about 1% to about 35%; about 1% to about 25%; about 10% to about 25%; about 5% to about 30%; about 5% to about 20%; about 5% to about 15%; or about 1% to about 5% within the visible spectrum.

In sum, the metal surfaces described herein can have the same or different spectral reflectance depending on whether a metal surface comprises nanostructure, microstructure or a combination of nano- and microstructure.

The spectral reflectance within the visible spectrum can be measured in any suitable way. One method for measuring the spectral reflectance for the at least one portion of the first major surface involves using a UV-VIS-NIR spectrometer (e.g., USB4000 & Flame NIR, Ocean Optics Co.) with normal incidence, as schematically illustrated in FIG. 2. Reflectance of the surface is its effectiveness in reflecting radiant energy and defined as the fraction of incident electromagnetic power that is reflected by the surface. The most general definition for reflectance p is the ratio of the radiant flux reflected $\Phi_r$ to the incident radiant flux $\Phi_i$, or $$\rho = \frac{\Phi_r}{\Phi_i} \quad (1)$$

Spectral reflectance is similarly defined at a specified wavelength $\lambda$ as $$\rho(\lambda) = \frac{\Phi_{\lambda r}}{\Phi_{\lambda i}} \quad (2)$$

The UV-VIS-NIR spectrometer measures the reflectance of the specimen surface in the wavelength range of about 450 nm to about 1670 nm. An integrating sphere is connected to the spectrometer for reflectance data collection. Before reflectance measurement, calibration of the reflectance scale is performed by measuring the incident flux remaining in the sphere after reflecting from a standard reference material. Then the specimen is placed against the entrance port for the actual reflectance measurement. OCEANVIEW® software was utilized to process and visualize the spectral reflectance measurement results. Each specimen surface is measured for multiple (e.g., four) times at various locations, and the averaged spectral reflectance is assessed.

In addition to the WCA and reflectance described herein, or alternatively, the micro- and nanostructured metal surfaces described herein can have a spectral reflectance of less than about 60%; less than about 55%; less than about 50%; less than about 45%; less than about 40%; less than about 30%; less than about 35%; less than about 30%; less than about 25%; less than about 20%; less than about 15%; less than about 10%; or less than about 5% within the IR-A spectrum (e.g., 700 nm to 1400 nm). For example, the micro- and nanostructured metal surfaces described herein can have a spectral reflectance of about 1% to about 60%; about 5% to about 35%; about 1% to about 5%; about 20% to about 50%; about 20% to about 35%; about 15% to about 35%; about 40% to about 60%; or about 25% to about 35% within the IR-A spectrum.

In addition to the WCA and reflectance described herein, or alternatively, the micro- and nanostructured metal surfaces described herein can have a spectral reflectance of less than about 60%; less than about 55%; less than about 50%; less than about 45%; less than about 40%; less than about 30%; less than about 35%; less than about 30%; less than about 25%; less than about 20%; less than about 15%; less than about 10%; or less than about 5% within the IR-B spectrum (e.g., 1400 nm to 3000 nm). For example, the micro- and nanostructured metal surfaces described herein can have a spectral reflectance of about 1% to about 60%; about 5% to about 35%; about 1% to about 5%; about 20% to about 50%; about 20% to about 35%; about 15% to about 35%; about 40% to about 60%; or about 25% to about 35% within the IR-B spectrum.

In addition to the WCA and reflectance described herein and the spectral reflectance within the IR-A spectrum, the micro- and nanostructured metal surface can have a spectral reflectance of less than about 60%; less than about 55%; less than about 50%; less than about 45%; less than about 40%; less than about 30%; less than about 35%; less than about 30%; less than about 25%; less than about 20%; less than about 15%; less than about 10%; or less than about 5% within the IR-B spectrum. For example, in addition to the WCA and reflectance described herein and the spectral reflectance within the IR-A spectrum, the micro- and nanostructured metal surfaces described herein can have a spectral reflectance of about 1% to about 60%; about 5% to about 35%; about 1% to about 5%; about 20% to about 50%; about 20% to about 35%; about 15% to about 35%; about 40% to about 60%; or about 25% to about 35% within the IR-B spectrum.

The metal piece used to make the micro- and nanostructured metal surfaces described herein can be made of any suitable metal including steel, titanium, aluminum, magnesium, and alloys thereof. Specific examples of suitable materials for the modified metal piece include, but are not limited to, AISI 4130 steel, titanium Ti-6Al-4V alloy (Ti-6Al-4V), aluminum alloy 6061 alloy (AA-6061) or magnesium AZ31B alloy (Mg AZ31B).

The metal piece used to make the micro- and nanostructured metal surfaces described herein can be made of aluminum alloys. Aluminum alloys can be categorized into a number of groups based on the particular material's characteristics such as its ability to respond to thermal and mechanical treatment and the primary alloying element added to the aluminum alloy. Wrought and cast aluminums have different systems of identification. The wrought system is a 4-digit system and the castings having a 3-digit and 1-decimal place system. Wrought aluminum alloys are contemplated, including the 1000-, 2000-, 3000-, 4000-, 5000-, 6000-, and 7000-series of wrought aluminum alloys which can be categorized as shown in Table 1, where: x, if different from 0, indicates a modification of the specific alloy, and y and z are arbitrary numbers given to identify a specific alloy in the series. For example, 5000-series alloy 5183, the number 5 Indicates that it is of the magnesium alloy series, the 1 indicates that it is the 1st modification to the original alloy 5083, and the 83 identifies it in the 5xyz series. The only exception to this alloy numbering system Is with the 1xyz series aluminum alloys (pure aluminums) in which case, y and z provide the minimum aluminum percentage above 99%. Thus, for example, 1000-series alloy 1350 comprises 99.50% minimum aluminum.

TABLE 1

| Alloy Series | Principal Alloying Element |
|---|---|
| 1xyz | 99.000% aluminum |
| 2xyz | Copper |
| 3xyz | Manganese |
| 4xyz | Silicon |
| 5xyz | Magnesium |
| 6xyz | Magnesium and silicon |
| 7xyz | Zinc |

The metal piece used to make the micro- and nanostructured metal surfaces described herein can have any suitable dimensions. The dimensions of the metal piece used to make the micro- and nanostructured metal surfaces described herein can range from millimeter in size (length, width or both) to meters in size (length, width or both). The methods described herein can be carried out such that even the largest metal pieces can be modified by the methods described herein within hours or even minutes.

As discussed herein, the hydrophobic (e.g., superhydrophobic) region(s) of the micro- and nanostructured metal surfaces described herein are prepared by, e.g., treating a first treated surface with a composition comprising a hydrophobic surface modifier to obtain a hydrophobic first treated surface. The hydrophobic surface modifier can be a silane of the formula (I):

$$X^1{}_3SiR^1 \qquad (I)$$

wherein each $X^1$ is halogen or a $C_1$-$C_6$-alkoxy group; and $R^1$ is a $C_8$-$C_{20}$-fluoro-substituted alkyl group.

The terms "halo," "halogen," or "halide" group, as used herein, by themselves or as part of another substituent, mean, unless otherwise stated, a fluorine, chlorine, bromine, or iodine atom. $X^1$ can be chlorine.

The term "alkoxy" as used herein refers to an "—O-alkyl" or "—O— cycloalkyl" group. The term "alkyl," as used herein refers to substituted or unsubstituted straight chain and branched alkyl groups and cycloalkyl groups having from 1 to 40 carbon atoms ($C_1$-$C_{40}$), 1 to about 20 carbon atoms ($C_1$-$C_{20}$), 1 to 12 carbons ($C_1$-$C_{12}$), 1 to 8 carbon atoms ($C_1$-$C_8$), or from 1 to 6 carbon atoms ($C_1$-$C_6$). Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, Iso-butyl, sec-butyl, t-butyl, neopentyl, isopentyl, and 2,2-dimethylpropyl groups. Representative substituted alkyl groups can be substituted one or more times with any of the organofunctional groups listed herein, for example, amino, hydroxy, cyano, carboxy, nitro, thio, alkoxy, and halogen groups.

The term "cycloalkyl" as used herein refers to substituted or unsubstituted cyclic alkyl groups such as, but not limited to, cyclopropyl, cyclobutyl, cyclopentyl, cyclohexyl, cycloheptyl, and cyclooctyl groups. The cycloalkyl group can have 3 to about 8-12 ring members. Or the number of ring carbon atoms range from 3 to 4, 5, 6, or 7. Cycloalkyl groups can have 3 to 6 carbon atoms ($C_3$-$C_6$). Cycloakyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Representative substituted cycloalkyl groups can be substituted one or more times with any of the organofunctional groups listed herein, for example, amino, hydroxy, cyano, carboxy, nitro, thio, alkoxy, and halogen groups.

$R^1$ can be a group having the formula $C_n$—$F_{2n+1}$—$(CH_2)_2$— (organofunctional group), wherein the "organofunctional group" is 1H, 1H, 2H, 2H-perfluoralkyl; and n is an integer from 8 to 20.

As discussed herein, the hydrophilic (e.g., superhydrophilic) region(s) of the micro- and nanostructured metal surfaces described herein are prepared by, e.g., treating a second treated surface with a composition comprising a hydrophilic surface modifier to obtain a hydrophilic first treated surface corresponding to the at least one hydrophilic region 104. The hydrophilic surface modifier can be a silane of the formula (II):

$$X^1{}_3SiR^2 \qquad (II)$$

wherein each $X^1$ is halogen or a $C_1$-$C_6$-alkoxy group; and $R^2$ is a $C_1$-$C_6$-cyano-substituted alkyl group.

The micro- and nanostructured metal surfaces described herein can have any suitable arithmetical mean roughness. In addition, any of the metal surfaces described herein can have regions of varying roughness and textures (e.g., see FIGS. 9A-9D, showing various textures that can be present across regions or an entire metal surface including microstructured regions present on a metal surface) across the metal surfaces. For example, a microstructured region, regardless of whether the region is hydrophobic or hydrophilic can have an arithmetical mean roughness Ra of less than 500 μm, less than 200 μm, less than 150 μm, less than 100 μm, less than 50 μm, less than 10 μm; from about 10 μm to about 500 μm, about 50 μm to about 250 μm, about 50 μm to about 500 μm, about 20 μm to about 100 μm or about 100 μm to about 500 μm. For example, a nanostructured region, regardless of whether the region is hydrophobic or hydrophilic can have an arithmetical mean roughness Ra of less than 2 μm, less than 1 μm, less than 500 nm, less than 100 nm, less than 50 nm, less than 10 nm; from about 1 nm to about 2 μm, about 50 nm to about 1 μm, about 50 nm to about 500 nm, about 1 nm to about 100 nm or about 100 nm to about 800 nm. In addition, or alternatively, the at least one hydrophobic region and the at least one hydrophilic region can each have different arithmetical mean roughness values. For example, the arithmetical mean roughness of the at least one hydrophobic region can be less than the arithmetical mean roughness of the at least one hydrophilic region. For example, the ratio of the arithmetical mean roughness of the at least one hydrophobic region to the arithmetical mean roughness of the at least one hydrophilic region:

Ra(hydrophobic):Ra(hydrophilic)

can be less than 1, such as 0.5, 0.1 or 0.01, including from about 0.1 to about 0.9.

Figure 10:
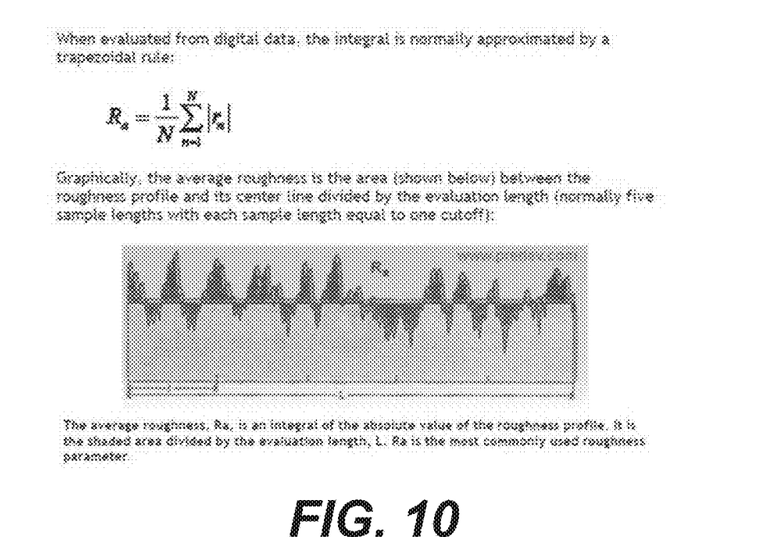
FIG. 10 is a graphical representation of average roughness and how average roughness can be calculated.

Surface roughness, often shortened to roughness, is a component of surface texture. It is quantified by the deviations in the direction of the normal vector of a real surface from its ideal form. See FIG. 10. If these deviations are large, the surface is rough; if they are small, the surface is smooth. In surface metrology, roughness is typically considered to be the high-frequency, short-wavelength component of a measured surface. However, in practice it is often necessary to know both the amplitude and frequency to ensure that a surface is fit for a purpose. The profile roughness parameters are included in BS EN ISO 4287:2000 British standard, identical with the ISO 4287:1997 standard. The standard is based on the "M" (mean line) system. Ra is the arithmetic average value of filtered roughness profile determined from deviations about the center line within the evaluation length. Ra is needed for the nanostructured regions. Re may not be appropriate for the microstructured regions as they are highly structured with feature size ranging from tens of microns or hundreds of microns.

The methods described herein can produce micro- and nanostructured metal surfaces comprising various random micro- and nanoscale structures Including rods, cones, channels (e.g., microchannels), cavities, and combinations thereof. These features vary in size ranging from less than 100 nm to several hundreds of nm.

The laser used to generate the first and second treated surfaces can be any suitable laser, including a nanosecond, picosecond or femtosecond laser.

The laser scanning time used to generate the first and second treated surfaces can be any suitable time, such as least about 0.25 seconds/in$^2$, but can be significantly faster at, e.g., at least about 0.1 seconds/in$^2$; at least about 0.05 seconds/in$^2$; at least about 0.025 seconds/in$^2$; from about 0.025 seconds/in$^2$ to about 15 seconds/in$^2$; about 0.025 seconds/in$^2$ to about 0.25 seconds/in$^2$; about 0.1 seconds/in$^2$ to about 0.9 seconds/in$^2$; or about 1 seconds/in$^2$ to about 5 seconds/in$^2$.

The laser power used to generate the first and second treated surfaces can be any suitable power. For example, the laser used to generate the first and second treated surfaces can be a nanosecond laser where the power of each pulse ranges from about 300 mJ to about 20 J; about 300 mJ to about 800 mJ; about 300 mJ to about 2 J; about 300 mJ to about 1 J; about 500 mJ to about 1 J; about 500 mJ to about 1.5 J; about 500 mJ to about 800 mJ; or about 450 mJ to about 900 mJ.

The laser intensity used to generate the first and second treated surfaces can be any suitable intensity. For example, the laser intensity can be greater than about 0.2 GW/cm$^2$ and can be greater than about 0.5 GW/cm$^2$; greater than about 1 GW/cm$^2$; greater than about 1.5 GW/cm$^2$; greater than about 2 GW/cm$^2$; greater than about 5 GW/cm$^2$; greater than about 10 GW/cm$^2$; greater than about 15 GW/cm$^2$; greater than about 20 GW/cm$^2$; about 0.2 GW/cm$^2$ to about 20 GW/cm$^2$; about 0.2 GW/cm$^2$ to about 5 GW/cm$^2$; about 5 GW/cm$^2$ to about 15 GW/cm$^2$; or about 10 GW/cm$^2$ to about 20 GW/cm$^2$.

Values expressed in a range format should be interpreted in a flexible manner to include not only the numerical values explicitly recited as the limits of the range, but also to include all the individual numerical values or sub-ranges encompassed within that range as if each numerical value and sub-range were explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are Incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

EXAMPLES

It is understood that the examples and embodiments described herein are for illustrative purposes only and that various modifications or changes in light thereof will be suggested to one skilled in the art without departing from the scope of the present disclosure.

Introduction

A laser-assisted functionalization (LAF) method is presented herein to fabricate a superhydrophobic-superhydrophilic patterned surface on a large-area metal alloy with a high process throughput. The LAF method comprises four steps, including two laser processing steps and two surface chemistry modification steps. Two strategies are demonstrated to fabricate extreme wettability patterns on aluminum alloy without using protective masking. Strategy I fabricates contrasting topography and chemistry where superhydrophobic regions are micro- and nanostructured with fluorocarbon chemistry, and superhydrophilic regions contain microchannels with nitrile chemistry. Conversely, strategy II fabricates similar microchannel topography for both wettability regions with contrasting chemistry. Surface topography patterning, from low-roughness, isotropic, random micro- and nanostructured texture to highly structured texture, is achieved by adjusting the laser parameters during LAF.

The methods described herein constitute the first known laser-based surface engineering method that decouples extreme wettability from surface topography. In addition, anti-reflection surface property, ranging from moderately reduced reflectivity of about 50% to ultralow reflectivity of less than 10%, is achieved using this process. The processing mechanism, surface chemistry, and surface topography are analyzed to demonstrate the simplicity, robustness, and feasibility of the process.

Figure 3:
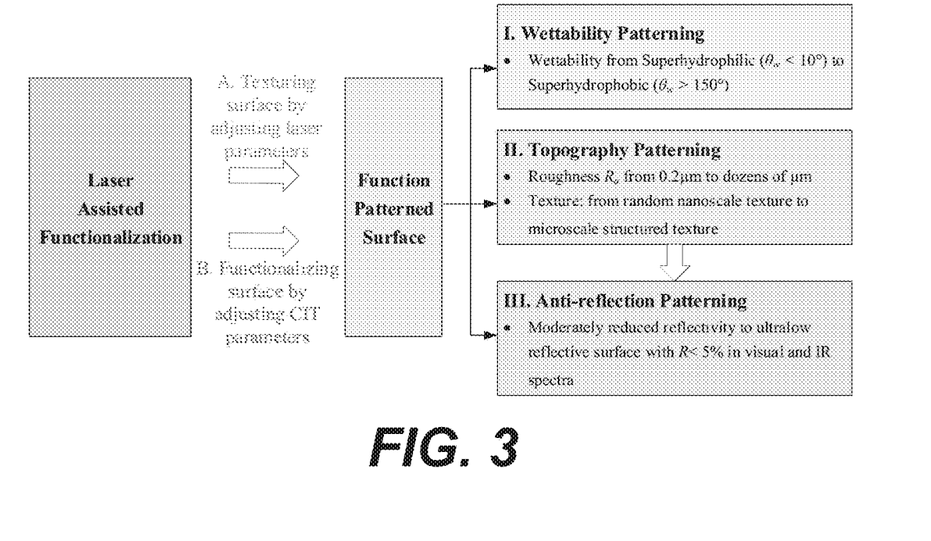
FIG. 3 is a schematic representation of a laser-assisted functionalization (LAF) method for patterning large-area metal surfaces with varying functionalities (e.g., superhydrophobic and superhydrophilic functionalities). I. Surface wetting, ranging from superhydrophilicity to superhydrophobicity; II. Surface topography, ranging from a low-roughness, isotropic, random micro- and nanostructured texture to a microscale, highly structured texture; III. Antireflection, ranging from moderately reduced reflectivity to ultralow reflectivity of less than 5%. Two sets of engineering parameters can be adjusted in the LAF process to accurately control these functionalities: laser processing parameters are mainly used to control the surface texture, while chemical treatment parameters are mainly to selectively functionalize the surface.

An example of a maskless laser-assisted functionalization (LAF) method for patterning large-area metal surfaces with varying functionalities consistent with the disclosure is illustrated in FIG. 3 and includes: i. Surface wetting, ranging from superhydrophilicity to superhydrophobicity; ii. Surface topography, ranging from a low-roughness, isotropic, random nanostructured texture to a microscale, highly structured texture; ii. Anti-reflection, ranging from moderately reduced reflectivity to ultralow reflectivity of less than 10%.

Two sets of engineering parameters can be adjusted in the LAF process to accurately control these functionalities: (1) laser surface processing parameters, e.g., laser power Intensity, scanning speed and overlap ratio, etc. are controlled to primarily modify surface topography; and (2) chemical immersion treatment parameters are selected to modify surface chemistry. It should be noted that a novel etching effect of a chlorosilane reagent can generate nanostructures on a laser-treated metal surface. This developed process is a maskless method to directly fabricate target surface structures and chemistry on a metal substrate. The antireflective surface property, or high absorptive surface, can be tuned by varying surface structures from nanoscale textures to microscale surface textures. The proposed strategies are highly efficient, maskless, and capable of rapidly treating a large surface area for various applications.

As schematically illustrated in FIG. 1, two processing strategies have been developed with distinct means to create a checkerboard pattern of alternating perfect-wetting (also known as superhydrophilic) and non-wetting (also known as superhydrophobic) regions. Strategy I first creates a micro- and nanostructured superhydrophobic background over the entire substrate surface, then selectively laser patterns and functionalizes the substrate surface with superhydrophilic patches. Strategy I comprises the following steps:

Step 1: The substrate surface is first raster-scanned over the entire domain under water using a high-energy nanosecond pulsed laser. During laser processing of the workpiece, deionized water confines the laser-induced plasma and enhances treatment effects. In contrast to conventional laser texturing methods, novel aspects of this step entail application of high energy radiation as nanosecond pulses at a coarse spatial resolution and under water confinement.

Step 2: The laser-treated substrate surface is functionalized with superhydrophobicity by chemical immersion treatment in an ethanol solution of 1.5 wt % chlorosilane reagent $[CF_3(CF_2)_5(CH_2)_2SiCl_3]$, also known as "FOTS," for three hours. The surface is then cleaned with deionized water, dried with compressed nitrogen, and kept in a vacuum chamber at 80° C. for 1 hour. Step 2 chemically functionalizes the entire laser-treated substrate surface to superhydrophobicity, and constitutes an operationally easier and more efficient method versus conventional surface silane modification through deposition of evaporated silane reagents under vacuum conditions and elevated temperatures.

Step 3: Selective laser patterning is performed in air using the pulsed laser on areas intended to exhibit superhydrophilicity. The laser treatment in this step creates unidirectional microchannel patterns and removes the superhydrophobic functional group in those treated areas from Step 2.

Step 4: The entire surface is subjected to immersion treatment in an ethanol solution of 1.5 wt % 3-3-cyanopropyltrichlorosilane reagent $[CN(CH_2)_3SiCl_3]$, also known as "CPTS," for three hours, and subsequently cleaned with deionized water, dried with compressed nitrogen, and kept in a vacuum chamber at 80° C. for 1 hour. Step 2 chemically functionalizes the laser-patterned areas from Step 3 to superhydrophilicity, while the superhydrophobic areas remain unchanged.

As a result of this 4-step process, Strategy I creates superhydrophobic areas having random nanostructure with a fluorocarbon group, whereas the superhydrophilic areas Incorporate microchannel structures with a nitrile group. There are two potential issues associated with Strategy I: (1) In Step 1, rather than treating only the superhydrophobic areas, the laser treats the whole substrate surface, which consumes additional time and may add manufacturing cost to the process. Yet, the advantage of treating the whole substrate surface in Step 1 enables an easier setup in Step 3 to yield selective laser patterning without the need for a highly automated processing system with microscale alignment accuracy. (2) In Step 4, the superhydrophilic immersion treatment can potentially alter the chemical group on the superhydrophobic zones and thereby undesirably alter their wetting behavior. The potential chemical Interaction of hydrophilic chemical reagent with the superhydrophobic areas must be evaluated.

A second strategy is proposed to alleviate issues encountered in Step 1 and improve laser processing efficiency (FIG. 2). This strategy (Strategy II) also involves four steps as follows:

Step 1: Selective laser patterning is first performed in air using a nanosecond laser on areas intended to exhibit superhydrophobicity. Similar to Strategy I, it should be noted a laser raster scan under water confinement can also be applied in this step to further improve laser processing efficiency. Laser raster scan in air using finer spot size improves the pattern accuracy and hence is implemented in this work.

Step 2: The selected areas are then functionalized with superhydrophobicity by chemical immersion treatment in an ethanol solution of 1.5 wt % FOTS reagent for three hours, cleaned with deionized water, dried with compressed nitrogen, and kept in a vacuum chamber at 80° C. for 1 hour.

Step 3: A second selective laser patterning is performed on areas intended to show superhydrophillicity.

Step 4: The areas laser-treated in Step 3 are functionalized with superhydrophilicity by chemical immersion treatment in an ethanol solution of 1.5 wt % CPTS reagent for three hours and then subject to the same cleaning, drying, and vacuum storage conditions as in Step 2.

Strategy II creates microchannel structures across the substrate surface with fluorocarbon groups in the superhydrophobic areas and nitrile groups in the superhydrophilic areas. Compared with Strategy I, Strategy II improves pattern processing efficiency wherein chemical treatment modules are integrated with an automated LAF system is developed with Integrated chemical treatment modules. The precision level of the LAF process is ~100 μm. The processing efficiency of LAF mainly depends on the laser processing step. The chemical immersion process does not dictate the overall processing efficiency as the treatment time for 1 cm2 and 100 cm2 is the same. Therefore, the processing efficiency of LAF depends on the laser processing in step 1 and 3. For Strategy I, processing efficiency of step 1 is 54 cm2/min and for step 3 is 0.3 cm2/min. For Strategy II, processing efficiency of both step 1 and 3 is 0.3 cm2/min. The processing efficiency and precision can be further enhanced if an industry-level nanosecond laser is used.

Example 1

Both LAF strategies were employed to fabricate a 10 cm×10 cm AA6061 sample with an extreme wettability checkerboard pattern (FIGS. 4A-4D). In both Illustrations, the darker squares are the superhydrophilic areas, while the lighter ones are the superhydrophobic areas. Water forms spherical droplets on the superhydrophobic regions. The superhydrophobic regions on the surface had a $\theta_w>150°$ and a $\theta_{Roll-off}<10°$. Water droplets also bounced off the superhydrophobic regions, whereas in contrast, water droplets on contact with the surface, immediately (20 ms) spread across the surface on the superhydrophilic areas. We also fabricated complex wettability patterns, including a superhydrophilic maze and QR code (corresponding to the authors' research website) patterns on a superhydrophobic background using Strategy I (FIGS. 4G-4H). LAF process laser scanning flexibility enables the production of complex geometries and pattern customization at a pattern resolution of ~100 μm. It should be noted that these two strategies are universal and applicable to pico- and femtosecond lasers as well. These strategies can also be applied to numerous other materials, including stainless steel, titanium alloy, magnesium alloy, etc.

Figures 4A, 4B, 4C, 4D, 4E, 4F, 4G, 4H, 4I:
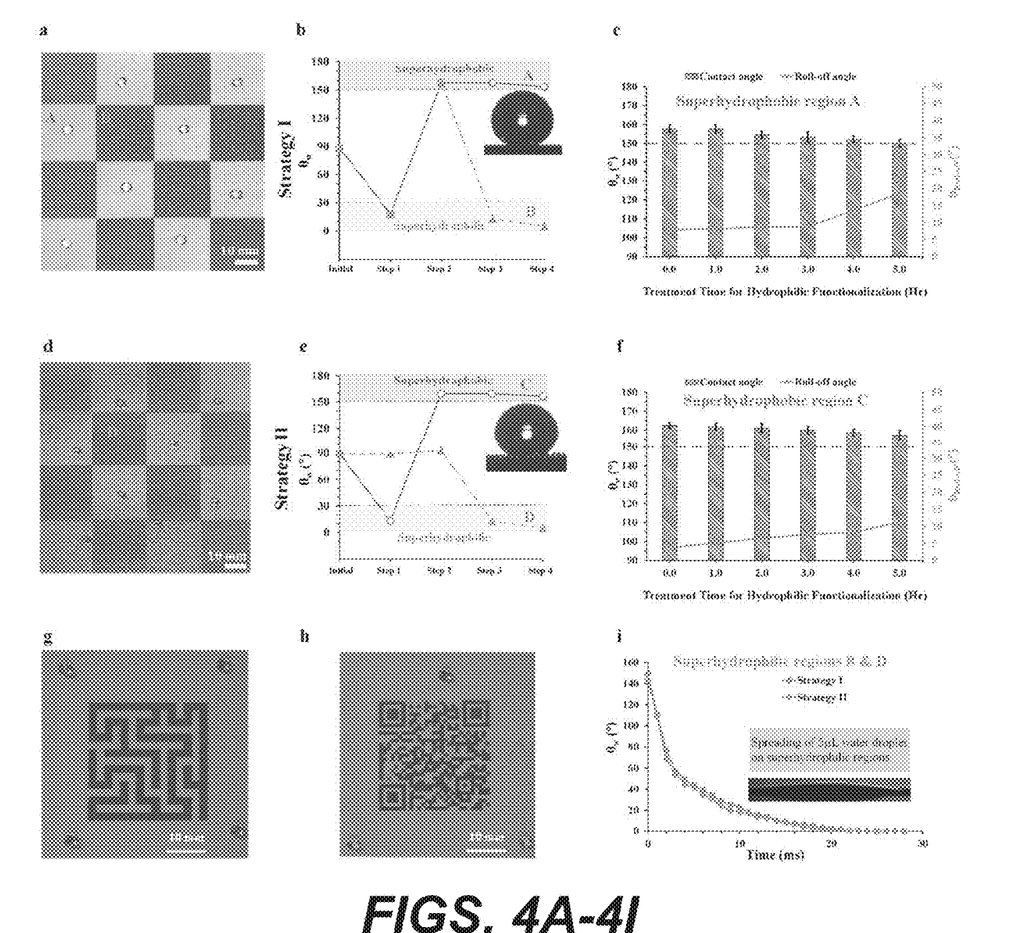
FIG. 4A is a photograph of a surface of extreme wettability checkerboard pattern prepared by Strategy I. 5 µL water was dropped onto each superhydrophobic block, while 200 µL water was dropped onto each superhydrophilic block.
FIG. 4B is a plot showing the progression of wettability of designed superhydrophilic and superhydrophobic regions in Strategy I.
FIG. 4C is a plot showing the influence of hydrophilic chemical treatment time on the superhydrophobic areas for Strategy I.
FIG. 4D is a photograph of a surface of extreme wettability checkerboard pattern prepared by Strategy II.
FIG. 4E is a plot showing the progression of wettability of designed superhydrophilic and superhydrophobic regions in Strategy II.
FIG. 4F is a plot showing the influence of hydrophilic chemical treatment time on the superhydrophobic areas for Strategy II.
FIG. 4G is a photograph of a superhydrophilic maze pattern over a superhydrophobic background.
FIG. 4H is a photograph of a superhydrophilic QR code pattern over a superhydrophobic background.
FIG. 4I is a plot showing quick spreading of 5 µL water droplet on superhydrophilic regions of surfaces prepared by Strategies I and II.

The progression of wettability for designed superhydrophobic and superhydrophilic areas was experimentally determined for both Strategy I and Strategy II. As can be seen in FIG. 4B, immediately after Step 1 of Strategy I, the substrate surface becomes superhydrophilic; however, the newly gained superhydrophilicity is not stable and tends to become hydrophobic upon storage in air over an extended time through absorption of airborne organic components. Step 2 functionalizes the entire substrate surface with superhydrophobicity by creating fluorocarbon chemistry groups. During Step 3, designated superhydrophilic areas, e.g., B in FIG. 4A, are laser raster-scanned to remove the surface chemical group. Once this is accomplished, the scanned areas become temporarily superhydrophilic. Step 4 functionalizes these areas with stable superhydrophilicity by creating nitrile chemistry groups. It should be noted that the water contact angle of superhydrophobic areas, e.g., A in FIG. 4A, decreases by a few degrees subsequent to Step 4, but area A retains its superhydrophobicity. In comparison, for Strategy II, designated area C is functionalized with superhydrophobicity while area D is patterned later for superhydrophilicity, as illustrated in FIG. 4D. It should be noted that immediately after selective laser patterning in Steps 1 and 3 in Strategy II, the treated areas become temporarily superhydrophilic. Chemical immersion treatment using FOTS and CPTS regents in Steps 2 and 4 in Strategy II will functionalize the laser-treated areas with superhydrophobicity and superhydrophilicity, respectively. For both Strategies I and II, the designated superhydrophobic areas A and C undergo hydrophilic chemical treatment—hence it is important to analyze the effects of hydrophilic chemical functionalization on the designated superhydrophobic areas.

As the designated superhydrophobic areas are subject to both hydrophobic and hydrophilic chemical treatment, the influence of hydrophilic chemical treatment time on the superhydrophobic areas was also analyzed for 1 to 6 hours (FIGS. 4C and 4F). Superhydrophobicity is usually defined by $\theta_w>150°$ and $\theta_{Roll-off}<10°$. For Strategy I, although $\theta_w$ was above 150°, $\theta_w$ decreased with increasing hydrophilic chemical treatment time. In addition, $\sigma_{Roll-off}$ also began to increase after 3 hours of treatment time and eventually increased more than 10° over an extended period. Similar trends were observed for Strategy II (FIG. 4F). Although $\theta_w$ maintained above 150°, $\theta_{Roll-off}$ began to increase and exceeded 10° limit for superhydrophobicity. Consequently, the optimal time for hydrophilic chemical treatment was selected as 3 hours. Both Strategies I and II exhibit wide processing windows to maintain superhydrophobicity after hydrophilic chemical treatment. The designated superhydrophilic regions of patterned wetting surface prepared using both Strategies I and II demonstrate a rapid spreading of water droplets governed by strong capillary effect and surface polarity (FIG. 4I). The as-prepared samples were left in the atmospheric condition for an observation period of 30 days. Both the superhydrophobic and superhydrophilic regions maintained their respective wettability for the observation period.

Example 2

Figure 5:
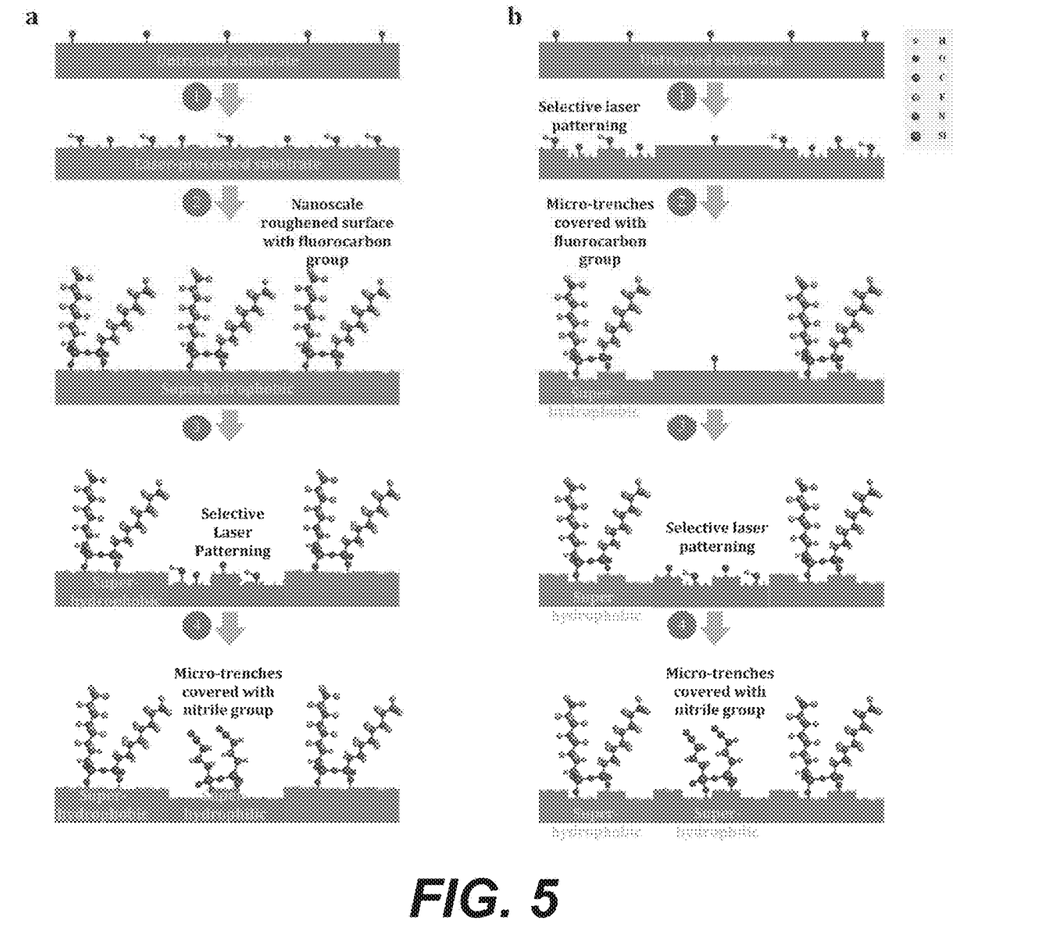
FIG. 5 is a carton showing the LAF processing mechanism believed to be operating in the surface structures and functionalization for patterned superhydrophobic-superhydrophilic metal surface by (a) Strategy I and (b) Strategy II.

Surface wettability of laser textured metal alloys is a combination of surface structure and chemistry attributes. The step-by-step processing mechanism to generate surface structure and surface chemistry for a patterned wetting surface is illustrated in FIG. 5 for both Strategies I and II. The processing intent of Strategy I was to prepare the entire surface as superhydrophobic at the outset of the process and was achieved through a combination of Steps 1 and 2. In Step 1, laser treatment in water confinement created nanoscale structures with surface oxides and hydroxide. These nanostructures were formed by ablation and redeposition of the ablated material. Aluminum is highly reactive to atmospheric oxygen and water at room temperature to form oxide and hydroxide. Laser ablation exposed the subsurface aluminum to the water layer. Therefore, the oxide and hydroxide surface chemistry was formed from the reaction of the AA6061 substrate of the ablated region with water molecules. In Step 2, fluorocarbon chains were anchored to the top of the surface nanostructure from the chemical reaction of FOTS molecules with metal oxides and hydroxide in an ethanol solution. Moreover, the created nanostructures were enhanced from the additional etching effect that occurred during the reaction of FOTS molecules with surface hydroxide. At the end of Step 2, the AA6061 surface consisted of randomly distributed nanostructures with fluorocarbon chemistry. In Step 3, the AA6061 surface was selectively laser-patterned in air. In those selected areas, microchannels were created with a width of ~100 μm and periodicity of ~250 μm between channels. High energy laser processing completely removed the fluorocarbon chemistry from the selected regions and created an array of microchannels with surface oxides and hydroxide. In Step 4, CPTS molecules were anchored on those selected areas on top of the ridges and valleys of the microchannels from reaction with surface oxides and hydroxides. Those selected areas, then, consisted of microchannels with nitrile chemistry. Other areas did not react extensively with CPTS reagent as the surface was protected by chemically inert fluorocarbon chains. Once Step 4 was completed, the superhydrophobic areas comprised nanostructures with fluorocarbon chemistry, and superhydrophilic areas contained microchannels with nitrile chemistry.

For Strategy II, the Intent of the fabrication process was to create a hierarchical structure in a patterned wetting area with fluorocarbon chemistry in the superhydrophobic region and nitrile chemistry in the superhydrophilic region. Specific designated areas were functionalized with superhydrophobicity by combining selective laser patterning in air, and then Immersion treated using an ethanol solution with a FOTS reagent. By combining these two steps, textured areas generated microchannels covered with nanostructures and fluorocarbon chemistry. In the second laser step, the remaining area was laser-textured in air, creating microchannels covered with oxides and hydroxides from the reaction of aluminum with atmospheric oxygen and moisture. During subsequent chemical immersion treatment with an ethanol solution with a CPTS reagent, the CPTS reagent reacted with the oxide and hydroxide of the newly textured area and generated nitrile chemistry. The superhydrophobic area did not react extensively with the CPTS reagent as the chemically inert fluorocarbon provided a barrier layer.

Example 3

Figures 6A, 6B, 6C, 6D:
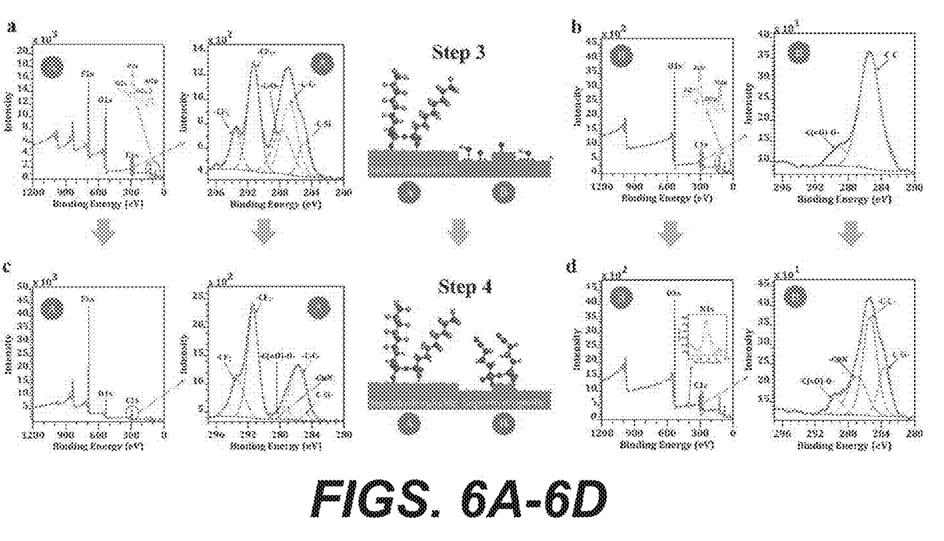
FIG. 6A is a survey spectrum and core-level spectrum of C is for superhydrophobic area after step 3.
FIG. 6B is a survey spectrum and core-level spectrum of C Is in the selectively laser patterned area after step 3.
FIG. 6C is a survey spectrum and core-level spectrum of C 1s for superhydrophobic area after step 4.
FIG. 6D is a survey spectrum and core-level spectrum of C is in the selectively laser patterned superhydrophilic area after step 4.

The surface chemistry of both the superhydrophobic areas and superhydrophilic areas on AA6061 surface was analyzed using X-ray Photoelectron Spectroscopy (XPS). Untreated and laser-treated AA6061 surfaces typically contain aluminum oxide and carbon contamination along with components of the base alloy. In order to completely validate the chemistry evolution of the process, XPS survey spectra were taken on both superhydrophobic and superhydrophilic regions on the AA6061 sample after Steps 3 and 4, separately, as shown in FIG. 6. Detailed elemental composition analysis was also performed. From the XPS spectra, we observed that both superhydrophobic and superhydrophilic regions for Steps 3 and 4 contain aluminum and oxygen. Aluminum is the major component of AA6061 alloy, with oxygen originating from the oxidation/hydroxylation that occurred during laser treatment. For samples obtained after Step 3, the major difference between the two regions was the presence of fluorine in the superhydrophobic area, as evidenced by a high fluorine peak in the XPS spectrum. Fluorine emanated from the $-CF_3$ and $-CF_2-$ groups in the FOTS reagent and was further confirmed by detailed elemental analysis, as shown in FIG. 6A. Analysis also revealed a carbon peak occurring as a combination of $-CF_3$, $-CF_2-$ and $-CH_2-$ chemical groups. These functional groups are present in the FOTS molecular structure, indicating that FOTS molecules were successfully attached to the surface. In contrast, those functional groups were eliminated during the second laser step, as shown in the XPS spectrum (FIG. 6B). The results validate the process mechanism described previously, as FOTS molecules were removed during laser patterning due to heat created by the laser leading to a breakdown of silane molecules. In samples obtained after Step 4, fluorine was also present in the superhydrophobic area (FIG. 6C). In contrast, however, the presence of nitrogen was detected from the XPS analysis of the superhydrophilic area (FIG. 6D). This incidence was also in accordance with the molecular structure of the CPTS reagent, for which a but $-C\equiv N$ group is existent in the CPTS molecule as opposed to $-CF_3-$ or $-CF_2-$ groups in FOTS. Therefore, it can be affirmed that the CPTS molecules successfully attached to the superhydrophilic surface after the second CIT process. The presence of the polar nitrile ($-C\equiv N$) functional group results in a tendency for the surface to interact with water, leading to the superhydrophilicity of the patterned area. It is worth noting that after Step 4, there is also a minuscule amount of nitrogen present in the superhydrophobic region, as shown in FIG. 5C. The presence of nitrogen derives from CPTS during the second functionalization; however, the amount of $-C\equiv N$ attached to the surface was too small to alter the wettability of the area. As a result, FOTS is still the dominant mechanism in rendering this region superhydrophobic. Based on XPS analysis results, the dramatic difference in wettability for the two different regions can be attributed to the difference in surface chemistry. During the fabrication process, FOTS and CPTS molecules were applied to the different surface areas, giving rise to the disparity in wetting behavior between the two regions.

Example 4

Figures 7A, 7B, 7C, 7D, 7E:
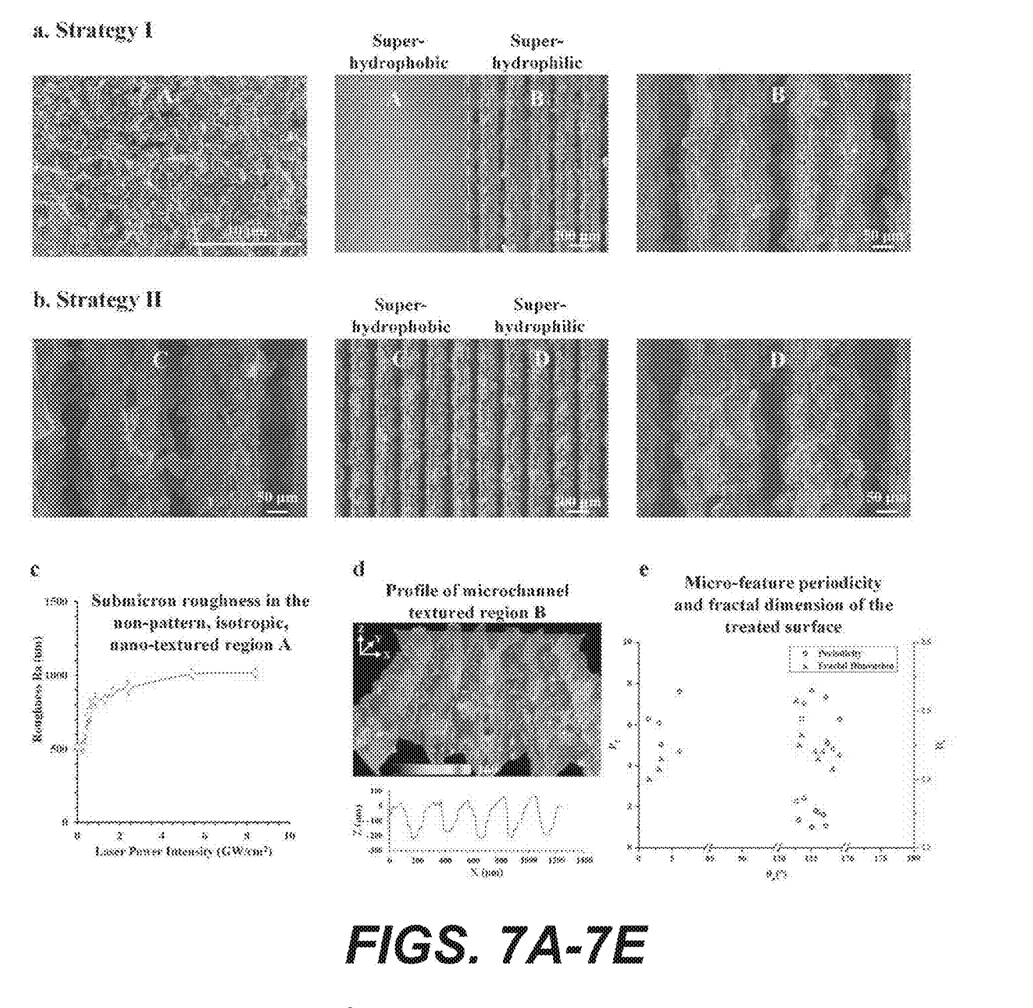
FIG. 7A is micrographs showing the surface topography by Strategy I, which is characterized by an isotropic, nanoscale texture in the superhydrophobic region and a microchannel texture in the superhydrophilic region.
FIG. 7B is micrographs showing surface topography by Strategy II is characterized by a microchannel texture in both superhydrophobic and superhydrophilic regions.
FIG. 7C is a plot showing control of submicron surface roughness Ra over the isotropic nanotextured region via the laser power intensity.
FIG. 7D is an areal profile of microchannel textured region using confocal microscopy.
FIG. 7E is a plot showing the computed fractal dimension Df and feature periodicity Pf of various wetting regions show a wide range of surface topography can be induced through LAF.

Surface topological features of patterned superhydrophobic and superhydrophilic regions were evaluated using a Hitachi S-4800 scanning electron microscope (SEM). For the surface generated using Strategy I, as shown in FIG. 7A (center), the superhydrophobic region A exhibits a smooth, isotropic texture in the treated area, but no obvious microscale patterns can be discerned. At a 20,000× magnification, the SEM micrograph FIG. 7A (left) of region A reveals closely packed nanoscale surface features of ripples and pores, ranging in size from less than 100 nm to several hundred nm. As shown in FIG. 7A (right), the superhydrophilic region B subjected to selective laser texturing shows an array of microchannels with a width of about 100 μm. The dramatic contrast in surface topography between the two regions is due to the difference in laser parameters: the nanosecond laser employed a large spot size of 4 mm and a short pulse duration of 8-10 ns for which and raster scanning with water confinement in region A produced a moderate laser surface peening effect. The water also confined the size of the laser-induced heat zone and resulted in a shallower laser-metal interaction layer. For the superhydrophilic region B subject to selective laser patterning, the laser was operated with a longer 100 ns pulse duration mode with a focused spot size of 100 μm and was, therefore, able to micromachine channels in air. The surface generated using Strategy II, as shown in FIG. 7B, is characterized by the same microchannels in both superhydrophobic and superhydrophilic regions.

The smooth micro- and nanostructured topography obtained from LAF (e.g., region A) can be quantified using surface roughness as a scale-specific descriptor. Arithmetical mean roughness Ra was measured using a Taylor Hobson Surtronic 25 profilometer over an evaluation length of a few millimeters. For each specimen, nine measurements were taken at different locations to obtain an average value. FIG. 7C presents surface roughness Ra ranging from a few hundred nanometers to one micron over the isotropic nano-textured region, which can be adjusted by the laser power Intensity. The microscale textured topography (e.g., regions B, C, and D) can be described by an areal profile scan using either white-light interferometry or confocal microscopy, as shown in FIG. 7D.

However, profile or areal roughness parameters alone are insufficient to describe surface topographic features, particularly for laser surface patterning processes. Fractal dimension (Df) and feature periodicity (Pf) are here introduced, obtained by executing computational algorithms to the microscale SEM micrographs to describe the topographic complexity and randomness of the LAF surface. Fractal dimension (2<Df<3) quantifies the disorder in terms of the space-filing ability of the surface texture and is used as a surface descriptor to characterize the complexity and self-similarity of the laser-induced surface texture. A fractal surface typically exhibits Irregularities that fil the embedding space (Df=3); thus, the fractal surface intrinsically occupies more space than a plane space (Df=2). As shown in FIG. 7E, Df of the laser microscale patterned surfaces ranges between 2.3 and 2.5, whereas a smooth micro- and nanostructured surface ranges between 2.6 and 2.8. Periodicity Pf of the surface structure was computed based on autocorrelation and Fourier transform. Autocorrelation function has been widely used as the basis for texture characterization, given the function maintains the same cyclic characteristics as the original signal. The periodicity here is a non-dimensional parameter that yields a number greater than zero, for which larger values represent higher periodicity. Typically, a periodicity value less than three indicates a random surface structure, while a periodicity value larger than three is indicative of extant periodic structures. As shown in FIG. 7E, the micropatterned surfaces exhibit the greatest periodicity of above 5, therefore they are referred to as highly structured texture. On the other hand, the micro- and nanostructured surfaces exhibit a low periodicity value of less than 3 due to their high randomness.

A wide range of surface profiles from low-roughness, isotropic, random micro- and nanostructured texture to highly structured texture can therefore be introduced to surface patterns by properly selecting laser parameters during LAF. It is important to note that the surface wettability patterning is independent of surface topography patterning, and hence various combinations of topography/wettability, namely microtextured/superhydrophobic, nanotextured/superhydrophobic, microtextured/superhydrophilic, nanotextured superhydrophilic, can all be achieved using LAF. Accurate control of surface topography patterning can be achieved by adjusting laser parameters, while surface wetting patterning is mostly controlled by chemical functionalization parameters. As a result, this constitutes the first known surface engineering method which decouples extreme surface wettability from surface topography.

Example 5

Figures 8A, 8C:
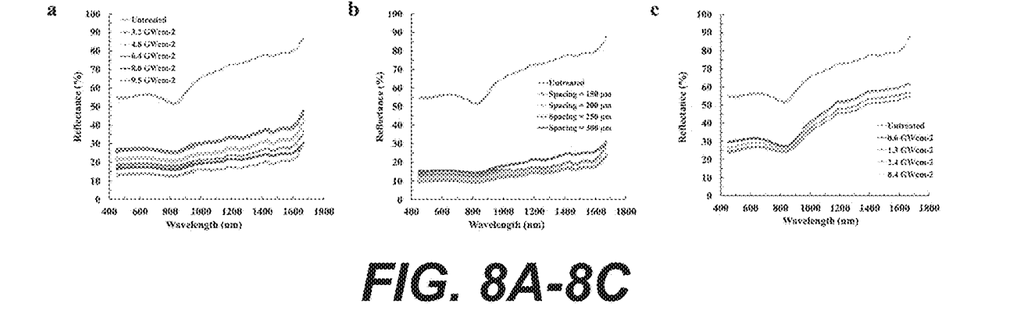
Figures 9A, 9B, 9C, 9D:
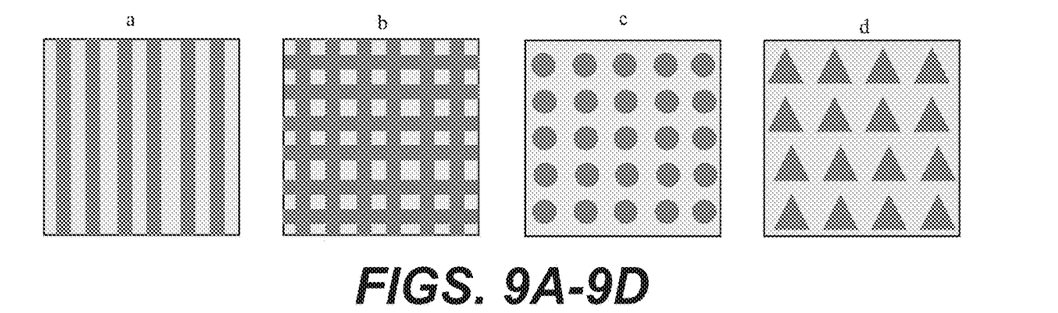
FIGS. 9A-9D are examples of the microstructures that can be achieved by the methods described herein.

The anti-reflection (or light absorbing) capability of patterned surfaces via LAF was characterized by spectral reflectance measurement. As can be seen in FIG. 8, the spectral reflectance for the untreated AA6061 specimens falls ~55% within the visible spectrum, 55%~76% within the IR-A spectrum, and 76%~87% within the IR-B spectrum. For surfaces with microchannel surface textures, the reflectivity was controlled from 26% to 13% in the visible spectrum, 26%-34% to 13%-19% in IR-A spectrum, and 34%-48% to 19%-31% in the IR-B spectrum by adjusting laser power intensity from 3.2 GWcm−2 to 9.5 GWcm−2 (FIG. 8A). Increasing laser intensity provides a deeper microchannel creating a longer optical path of incident light and more internal reflection inside the microchannels that results in more light absorbance. Additionally, spacing between microchannels was varied from 150 μm to 300 μm to impact surface reflectivity (FIG. 8B). Reducing the spacing between microchannels provides better light trapping in visible and infrared spectra. Reflectivity was less than 10% in the visible range when a 150 μm gap was used between microchannels. Light reflectivity of the micro- and nanostructured surface can be reduced by Increasing the laser power intensity (FIG. 7C), resulting in higher roughness (FIG. 7C).

A high-throughput laser-assisted functionalization method of wettability patterning ranging from superhydrophobicity to superhydrophilicity has been presented for large-area metal alloy surfaces. Surface wettability patterning is achieved by selectively processing surfaces with designated micro-/nanoscale topological structures and varying surface energy chemical groups using hybrid procedures that combine laser treatment and chemical immersion treatment. LAF is the first known laser-based surface engineering method which decouples extreme surface wettability from surface topography. Surface topography patterning, from low-roughness, isotropic, random micro- and nanostructured texture to highly structured texture, can be accurately achieved by adjusting laser parameters during LAF. Anti-reflection surface properties, ranging from moderately reduced reflectivity of approximately 50% to ultralow reflectivity of less than 5%, can be achieved using this process.

The advantages of this process are flexibility, speed, precision, repeatability, cost-effectiveness, contactless processing, versatility, and automation potential. This technology enables advanced and improved applications such as ultralow friction engine surfaces, anti-icing, electronics cooing, and energy harvesting.

What is claimed is:

1. A maskless method of making a metal surface comprising at least one hydrophobic region and at least one hydrophilic region, the method comprising:
   first treating at least one portion of a first major surface of a metal piece along a laser scan path to obtain a first treated surface;
   second treating the first treated surface with a composition comprising a hydrophobic surface modifier to obtain a hydrophobic first treated surface,
   third treating at least one portion of the hydrophobic first treated surface of the metal piece along a laser scan path to obtain a second treated surface; and
   fourth treating the second treated surface with a composition comprising a hydrophilic surface modifier to obtain a hydrophilic first treated surface;
   first treating at least one portion of a first major surface of a metal piece along a laser scan path to obtain a first treated surface;
   second treating the first treated surface with a composition comprising a hydrophilic surface modifier to obtain a hydrophilic first treated surface;
   third treating at least one portion of the hydrophilic first treated surface of the metal piece along a laser scan path to obtain a second treated surface; and
   fourth treating the second treated surface with a composition comprising a hydrophobic surface modifier to obtain a hydrophobic first treated surface;
   first treating at least one first portion of a first major surface of a metal piece along a laser scan path to obtain a first treated surface;
   second treating the first treated surface with a composition comprising a hydrophobic surface modifier to obtain a hydrophobic first treated surface;
   third treating at least a second portion of a first major surface of a metal piece along a laser scan path to obtain a second treated surface, the second portion different from the first portion; and
   fourth treating the second treated surface with a composition comprising a hydrophilic surface modifier to obtain a hydrophilic first treated surface; or
   first treating at least one first portion of a first major surface of a metal piece along a laser scan path to obtain a first treated surface;
   second treating the first treated surface with a composition comprising a hydrophilic surface modifier to obtain a hydrophilic first treated surface;
   third treating at least a second portion of a first major surface of a metal piece along a laser scan path to obtain a second treated surface, the second portion different from the first portion; and fourth treating the second treated surface with a composition comprising a hydrophobic surface modifier to obtain a hydrophobic first treated surface;
wherein
the hydrophilic surface modifier is a silane of the formula:

$X^1_3SiR^2$ wherein each $X^1$ is halogen or a $C_1$-$C_6$-alkoxy group; and $R^2$ is a $C_1$-$C_6$-cyano-substituted alkyl group.

2. The method of claim 1, wherein the at least one hydrophobic region is a superhydrophobic region.

3. The method of claim 1, wherein the at least one hydrophilic region is a superhydrophilic region.

4. The method of claim 1, wherein the first treating and the third treating are performed with the metal piece immersed in water.

5. The method of claim 1, wherein the first treating and the third treating are performed with the metal piece exposed to air.

6. The method of claim 1, wherein the metal surface has an arithmetical mean roughness Ra of less than 2 μm.

7. The method of claim 1, wherein the arithmetical mean roughness Ra of the at least one hydrophobic region is less than the arithmetical mean roughness Ra of the at least one hydrophilic region.

8. The method of claim 1, wherein the metal surface comprises random micro—and nanoscale structures.

9. The method of claim 1, wherein the laser scan path of the first treating and/or the third treating has a laser power intensity of at least 0.2 GW/cm² or a laser scanning time per unit area of at least 0.2 s/in².

10. The method of claim 1, wherein the hydrophobic surface modifier is a silane of the formula;

$X^1_3SiR^1$ wherein each $X^1$ is halogen or a $C_1$-$C_6$-alkoxy group; and $R^1$ is a $C_8$-$C_{20}$-fluoro-substituted alkyl group.

11. The method of claim 10, wherein R1 is a group having the formula $C_n$—$F_{2n+1}$—$(CH_2)_2$—, wherein n is an integer from 8 to 20.

12. The method of claim 1, the method further comprising:
washing the hydrophobic first treated surface with water; and optionally drying the washed hydrophobic first treated surface in a vacuum oven at 80° C. for at least about 15 minutes.

13. The method of claim 1, wherein at least one portion of the metal surface has a spectral reflectance of less than 25% within the visible spectrum.

14. The method of claim 1, wherein at least one portion of the metal surface has a water contact angle when exposed to water of at least 150° and a water roll-off angle of at most 10°.

15. The method of claim 1, wherein at least one portion of the metal surface has a spectral reflectance of less than 60% within the IR-A spectrum.

16. The method of claim 1, wherein at least one portion of the metal surface has a spectral reflectance of less than 60% within the IR-B spectrum.

17. The method of claim 1, wherein the metal piece comprises steel, titanium, aluminum, magnesium, and alloys thereof.

18. The method of claim 1, wherein the metal surface comprises at least one of micro—and nanostructured regions.

19. The method of claim 1, wherein at least one portion of the metal surface has a spectral reflectance of less than 30% within the IR-A spectrum.

20. The method of claim 1, wherein at least one portion of the metal surface has a spectral reflectance of less than 40% within the IR-B spectrum.

* * * * *